United States Patent [19]
Willden et al.

[11] Patent Number: 5,149,065
[45] Date of Patent: Sep. 22, 1992

[54] FOAM CUSHION WITH LABYRINTHINE SIDE SEAMS

[75] Inventors: Charles M. Willden, Grafton; Dee E. Willden, Port Washington, both of Wis.

[73] Assignee: Insta-Foam Products, Inc., Joliet, Ill.

[21] Appl. No.: 604,672

[22] Filed: Oct. 26, 1990

Related U.S. Application Data

[62] Division of Ser. No. 345,346, Apr. 28, 1989, Pat. No. 4,999,945.

[51] Int. Cl.$^5$ .............................................. B65D 85/00
[52] U.S. Cl. .................................. 267/136; 267/146; 206/523; 428/71
[58] Field of Search .................. 267/136, 153, 148, 1.5, 267/182, 142, 146; 188/268; 206/523, 524, 594; 428/71, 76; 53/451, 472, 552, 238, 370.7

[56] References Cited

U.S. PATENT DOCUMENTS

| | | | |
|---|---|---|---|
| 2,248,471 | 7/1941 | Stroop | 53/552 X |
| 2,803,100 | 5/1956 | Aalseth | 53/373 X |
| 3,204,385 | 9/1965 | De Remer et al. | 53/472 X |
| 3,244,043 | 4/1966 | Jore et al. | 219/244 X |
| 3,419,134 | 12/1968 | Fitts | 53/472 X |
| 3,460,740 | 8/1969 | Hagen | 206/523 |
| 3,480,505 | 11/1969 | Donnel, Jr. et al. | 219/545 X |
| 3,485,347 | 12/1969 | McGill et al. | 206/524 |
| 3,538,676 | 11/1970 | Runo et al. | 53/552 |
| 3,546,433 | 12/1970 | Johnson | 219/469 |
| 3,667,593 | 6/1972 | Pendleton | 206/46 FR |
| 3,735,551 | 12/1971 | Pratt | 53/22 A |
| 4,215,524 | 8/1980 | Saylor | 53/554 |
| 4,235,064 | 11/1980 | Wenger | 53/451 |
| 4,355,494 | 10/1982 | Tilman | 53/416 |
| 4,364,220 | 12/1982 | Rausing | 53/411 |
| 4,384,440 | 5/1983 | Ohlsson | 53/412 |
| 4,384,442 | 5/1983 | Pendleton | 53/554 |
| 4,490,962 | 1/1985 | Weis et al. | 53/550 |
| 4,674,268 | 6/1987 | Gavronsky et al. | 53/468 |
| 4,698,954 | 10/1987 | Behr et al. | 53/551 |
| 4,800,708 | 1/1989 | Sperry | 53/449 |
| 4,999,975 | 3/1991 | Willden et al. | 53/238 X |

*Primary Examiner*—Matthew C. Graham
*Assistant Examiner*—Josie A. Ballato
*Attorney, Agent, or Firm*—Lockwood, Alex, FitzGibbon & Cummings

[57] ABSTRACT

New and improved foam cushions for packaging purposes of the type including a cushion envelope partially filled with an expandable cushioning foam material are provided. The cushion envelope includes a foam-receiving cavity and is defined by a unitary web of material folded over itself to provide a folded side. An intermittent labyrinth side seam is provided along the side opposite the folded side and transverse top and bottom seams are provided to complete formation of the cushion envelope. A cushioning foam is disposed in the foam-receiving cavity. A method for making the foam cushions and an automated apparatus for making a continuous supply of the packaging cushions are also described.

5 Claims, 5 Drawing Sheets

FIG-1

FOAM CUSHION WITH LABYRINTHINE SIDE SEAMS

This application is a divisional of copending application(s) Ser. No. 345,346, filed Apr. 28, 1989, now U.S. Pat. No. 4,999,975.

The present invention relates generally to apparatus and methods for forming a plurality of individual foam-filled bags used for protective cushioning purposes. More particularly, the invention relates to methods and apparatus whereby a single web of flexible sheet material is intermittently advanced along a given axis, wherein side and end seams are formed therein to create a partial envelope with an open upstream side through which a charge of foamable material is deposited into the downstream portion of the partial envelope, following which the envelope is divided by the formation of a pair of end seams into one portion comprising a formed and filled bag and another portion wherein the upstream portion has become the downstream portion and a new upstream portion has been formed from a following increment of the flexible sheet material. At least one side seam is a labyrinth side seam which confines the foamable materials but permits the bag to be vented during introduction and subsequent expansion of the foam.

While the invention is capable of other uses, it is advantageously used in the protective packaging industry to form individual bags which are used in sets of two or more, together with an interior container such as a corrugated paper box, to provide protective cushioning for delicate objects during shipment.

In the packaging industry, there has been a need for improved methods and apparatus for manufacturing cushioning bags used in the packaging industry. It has for years been conventional in the packaging industry to protect fragile articles being shipped by providing a corrugated cardboard box, filling a part of the box with foamable ingredients from a dispenser, placing a plastic sheet over the rising upper surface of the foam, then placing the object to be protected in the box, covering the object with another sheet of plastic material and then adding an additional charge of foam over the plastic sheet before closing the top edges of the box.

This packaging method, and the articles produced thereby, are known to be advantageous in offering a certain degree of flexibility and excellent protection in use for fragile articles. However, this packaging method does require significant skill on the part of the operator, and sometimes creates the risk that the foam will not be accurately directed or its "shot size" may be misjudged.

Moreover, it can become tedious and nerve-wracking for the operators who may not have accurate control over the amount of ingredients dispensed, or other process variables. Moreover, this method is susceptible to variations in timing, i.e., the time wherein the protective sheet is placed down may vary among individual operators and create a certain amount of unreliability.

In addition, protecting the article relies on proper placing of the cover sheet and this may be done somewhat erratically. If the packaging process is carried out by a single operator, several manipulative steps are required. If the process is carried out by two people, one manipulating the sheets and the other discharging the foam, the process can become relatively labor-intensive.

Accordingly, there has been a need in the industry to develop packaging methods and apparatus which achieve the ability to provide closely confining, highly effective cushioning for shipped articles without certain of the drawbacks of the prior art. In this connection, it has been proposed to use individual bags of expanding foam as the cushioning material, with the thought of being able to control closely the shot size and hence volume of the foaming material, controlling these variables in relation to the box portion of the package. Where the contents are confined to a bag or other container, the need for careful covering of the expanding foam front may be obviated. This approach has proved successful but, because of certain of its own problems, is capable of further improvement.

Besides the foregoing, in the past, sone of the apparatus for forming and filling bags of foaming material have been unduly complex and expensive, or have required relatively skilled labor. In other cases, machines have required careful control of the seaming processes or the filling operation. In some machines, regulation of shot size was difficult, or the process by which the individual bags were formed required relatively complex or unreliable sheet guiding and feeding apparatus. In some machines, the formation of the top seam with the vents necessary to permit internal foam expansion rendered separation of the filled bags problematical and disadvantageous. Other bag-forming machines using foam-filling techniques were more or less effective, but still capable of significant improvement.

In the preferred form, the apparatus of the invention uses a flexible exterior sheet material, such as a thin sheet of polyethylene film to form the bag exterior; reactive ingredients are mixed and dispensed within the bag being formed in a manner to be described herein. Preferably, but not necessarily, the reactants form a flexible urethane foam of very low density, such as about 0.4 lb./cu. ft. The low density urethane foam is made from a polymeric isocyanate and one or more hyroxyl-rich resins; the exact formulations do not form a part of the present invention but are known to those skilled in the art. Formulations may be varied to suit the intended end use of the product, i.e., rise time, density, degree of cross-linking, type of blowing agent, etc.

While the invention is not limited to the particular embodiments described herein, several advantages are realized by the novel features of the preferred form of invention. One novel feature is the use of a single web of folded-over material to form the envelopes, and ultimately the bags, which are filled with the cushioning material. This method eliminates the need for forming a separate second side seam in the finished product.

Another preferred feature of the invention is the formation of a labyrinth type side seam in the envelopes and bags of the invention. By "labyrinth" as used herein, and in the claims, is meant a discontinuous side seam of the type which will provide venting of gas and vapor materials during bag formation and subsequent expansion but which will still provide an obstacle to the flow of expanding, curing urethane or similar foam. According to the invention, various forms of seams may be formed so as to provide a tortuous or indirect path of narrow cross-section which readily permits the escape of gas or vapors, but which, because of the adhesive character and the continually increasing viscosity of the foam as it cures, serves as an effective obstacle to the passage of the expanding foam.

Hence, the apparatus of the invention may use the folded-over web to create a side seam on one side of the bag and seal the top and bottom ends (or leading and trailing edges) of the bag completely without risk of foam leakage through the labyrinth side seam. This is especially advantageous in relation to the prior art practices of forming intermittent seams on the top and bottom edges of the product, as will appear.

The intermittent, labyrinth type side seam enables better control over end seam formation to be achieved, and this in turn aids in separating individual bags from each other as they are produced in sequence.

Another aspect of the invention is the arrangement of rollers which form the intermittent side seam in such a way that one or both rollers may be rapidly changed when it is desired to alter the labyrinth pattern.

In the preferred form, the method of the apparatus involves forming what is herein termed an elongated partial envelope, i.e., a folded-over web with a leading edge seam and a partial side seam forming its downstream portion, and opposed facing sheets of material with at least one open side forming the upstream portion of the envelope. Because in the preferred form of apparatus, the web of material is advanced downwardly as the bags are formed and filled, "lower" and "downstream" are sometimes used interchangeably. However, the invention is not strictly confined to vertical web movement. The open side of the envelope permits the dispensing unit to extend through the open side seam.

According to the inventive method, the liquid foamable materials pass from the dispenser in the upper portion of the envelope to the lower or bottom portion of the envelope where they are confined by the bottom or leading edge seam, preferably as it is traveling downwardly. As the web continues to travel downwardly and a charge of material passes into the lower portion of the envelope, the side seam continues to be formed after the materials cease to be dispensed.

After a predetermined increment of travel is reached, the advancement ceases transiently and a double end seam separated by a line of weakness is formed in the web, using a retractable seal bar arrangement. This forms the top or trailing edge seam on the lower bag and forms the leading edge or bottom seam of the next or upper envelope. Upon resumption of web advancement, the downstream, filled bag may be separated while the foam is still expanding and used in a manner which is known to those skilled in the art but which will be referred to herein. In the meantime, when advancement of the web resumes, the side seam on the envelope continues to be formed, dispensing occurs and foam expansion begins and then ceases while an additional length of side seam is formed and the end seam forming sequence is repeated. At the same time, other increments of web material are advanced to form new upstream, open-sided portions of the partial envelopes. Thus, the dispensing action fills the elongated envelope, which is subdivided so as to form a bag as a new upper envelope portion is formed. The dispensing occurs after each end seam formation and hence the liquid travels from the dispensing head located above the seam-forming bars to the seam which remains below the seam-forming bars. In the preferred form, means are provided for guiding the web so that a full bag of envelope width is maintained, bearing in mind the total width of the folded over web. Various auxiliary functions are provided in the apparatus of the invention, and their identity and function will appear as the description proceeds.

In view of the above-cited and other drawbacks of some prior art bag forming and filling methods and apparatus, it is an object of the present invention to provide an improved apparatus and method for forming and filling cushioning bags. The present inventive apparatus and methods overcome some or all of these drawbacks.

Another object of the invention is to provide a forming and filling apparatus which may be manufactured at low cost and which is simple and reliable in operation.

Another object is to provide a bag forming and filling machine which embodies a novel operating sequence.

A further object of the invention is to provide an apparatus for producing a series of bags filled with cushioning foam, which apparatus embodies a novel method or operating sequence in use.

A further object of the invention is to provide a method of forming and filling bags with cushioning foam, with the preferred method including the steps of utilizing a single, folded-over web of material with its open side providing access for a foam dispensing head, and which includes further steps of forming an envelope from this web, dispensing foamable liquid reactants into a downstream portion of the envelope as it is being advanced and formed, and then forming end seams to subdivide the envelope into upstream and downstream portions, with the downstream portion forming a filled bag and the upstream portion advancing and bringing an additional increment of film material for subsequent filling and subdivision.

Another object of the invention is to provide an apparatus which includes means for guiding a folded-over web of film around a dispensing head and forming a labyrinth type, intermittent side seam on the open side of the web of material to provide a bag with one or more vented side seams preventing escape of foam-cushioning material.

A further object of the invention is to provide an apparatus which in use forms labyrinth type, intermittent side seams in cushioning bags, thereby permitting the bag to be vented of gases or vapors and yet retain curing foamable fluids of increasing viscosity.

A still further object of the invention is to provide a bag-forming machine which, as a part of its operating sequence, provides an envelope with an open upper portion which may be filled and in which the envelope may be subseqently subdivided, into a filled bag which may be removed from the remainder of the envelope.

Yet another object of the invention is to provide an apparatus which includes a novel form of roller apparatus for creating a labyrinth type intermittent side seam.

A still further object of the invention is to provide a bag-forming and filling machine having an operating sequence which is readily adaptable to making bags of various widths and lengths in use, and filling them with different amounts of foamable material.

Another object of the invention is to provide a bag-forming and filling machine wherein an operator may vary the bag length by simple manipulation of length controls.

A still further object of the invention is to provide an apparatus and method which provides high quality bags for use in the packaging industry at low cost and without requiring skilled operator labor.

The foregoing and other objects and advantages of the invention are achieved in practice by providing a machine which includes means for receiving a supply of a flexible, bag-forming material in web form, for guiding the web of material past a dispenser unit so as to provide an open side edge portion through which the dispenser may extend, for intermittently advancing a portion of the web to form a partial, elongated envelope, filling a part of the envelope with a charge of foamable liquid, and subdividing the filled part of the envelope from the unfilled part to create a filled bag by forming a seam between filled and unfilled parts of the envelope.

The invention also achieves its objects by providing a method of intermittently advancing a web of material and forming envelopes from the material, filling parts of the envelopes with a foamable material and then subdividing the envelope into a leading, filling bag portion and a trailing, unfilled, open-sided portion, and thereafter advancing the open side portion and seaming its open side to form a completed, bag-forming portion of a following envelope.

The manner in which the foregoing and other objects and advantages are acheived in practice will become more clearly apparent when reference is made to the following detailed description of the preferred embodiments of the invention set forth by way of example and shown in the accompanying drawings, wherein like reference numbers indicate corresponding parts throughout.

DESCRIPTION OF THE PREFERRED EMBODIMENTS OF THE INVENTION

While it is understood that the invention may be embodied in different forms of apparatus, and that a method of the invention may be practiced by machines other than the one described herein in detail, for purposes of illustration, reference will be made to a presently preferred form of apparatus for forming and filling flexible bags.

Referring now to the drawings in greater detail, a bag forming and filling apparatus generally designated 10 is shown to embody the invention. The forming and filling apparatus includes a number of subassemblies, some of which may be described in generally functional terms before reference is made to the details of their construction.

These subassemblies include a machine frame generally designated 12, means generally designated 14 for positioning a roll or other supply of material generally designated 16 in continuous web form and from which a plurality of individual, foam-filled bags generally designated 18 (FIGS. 12 and 13–16) may be formed. The apparatus 10 also includes a bag forming and filling head generally designated 22 and which includes means for performing other principal operations incident to bag forming and filling. These include means generally designated 23 for guiding a web 24 of material from which the individual bags 18 are formed over a dispenser unit generally designated 26, for depositing individual charges of foamable reactants into the being-formed bags pursuant to the "instructions" furnished from a control panel 28. In addition, the head 22 includes means generally designated 30 in the form of a roller pair for forming a side seam on the bag and means generally designated 32 for forming transverse seams on the ends of the bags being formed and filled from time to time during machine operation.

Figure 1:
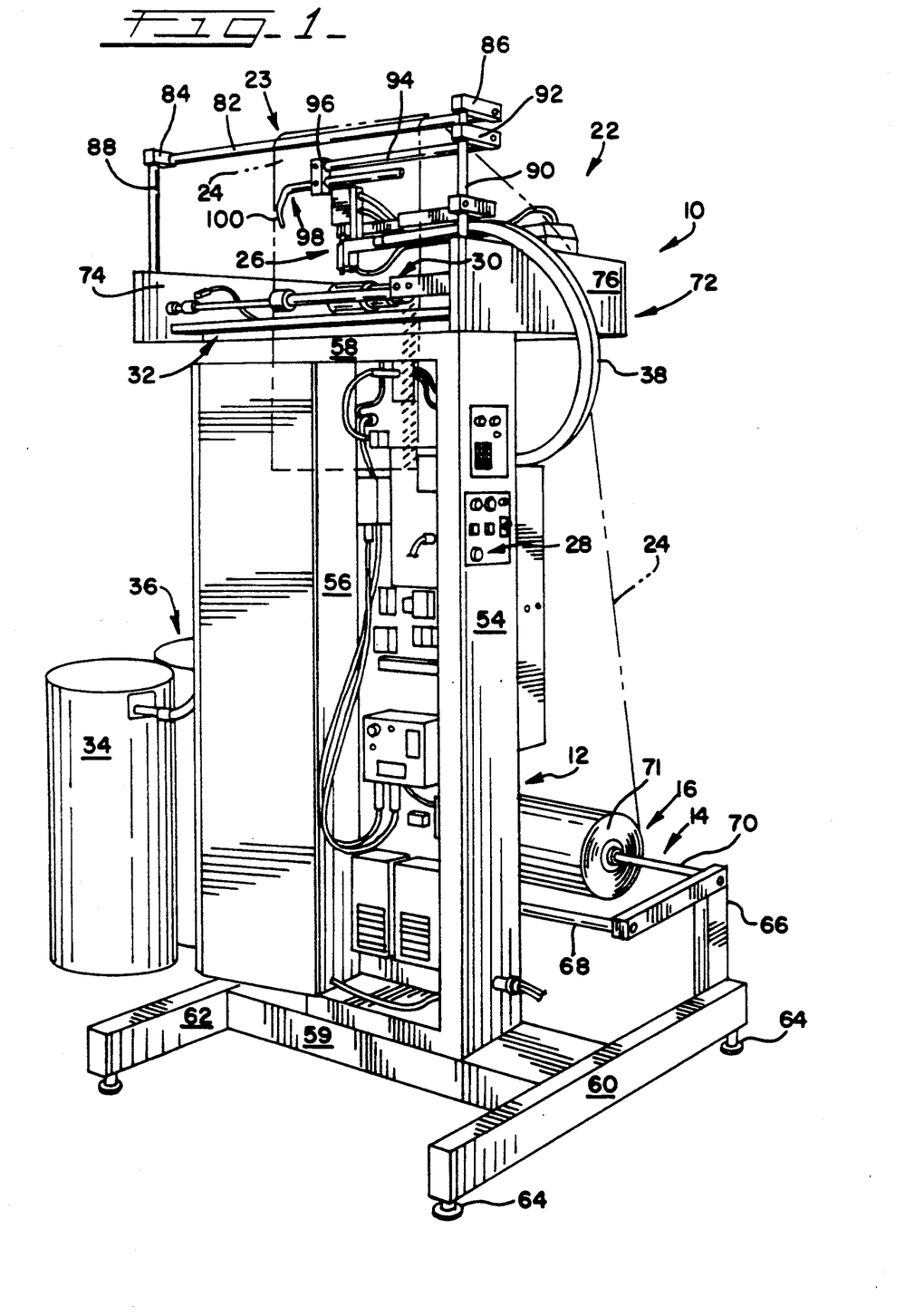
FIG. 1 is a perspective view of one form of the apparatus for manufacturing foam-filled pillows or cushions according to the invention, with such apparatus being shown to include a frame unit, means for positioning a supply of flexible bag-forming material in web form and for advancing and guiding the web material past a bag forming and filling station which includes a dispensing head, a pair of seaming rollers, and means for heat sealing adjacent web margins to form the trailing and leading edge seams respectively on a completely formed and filled bag and on a partial envelope from which a filled bag will be formed.

Additionally, FIG. 1 shows that means in the form of tanks 34, 36 are provided for storing the reactants from which the foamable compositions are mixed, and that conduit means in the form of tubes or hoses 38 for supplying these liquid reactants to the dispenser 26 are also provided.

Each of the foregoing principal elements or subassemblies in turn comprises a number of individual elements, some or all of which are described in detail herein. Other principal subassemblies include a drive motor assembly generally designated 40 (FIGS. 2–3), a drive train system generally designated 42, a control unit generally designated 44 for sychronizing the web feed and ingredient dispensing functions, a dispensing head cleaner unit generally designated 48, left and right hand drive roller pairs 50, 52, the right hand pair of which is preferably a roller pair for intermittent labyrinth type side seam to seal the free margins of the web to each other.

Referring again to FIGS. 1-3, the machine frame 12 is shown to include a pair of substantially identical left and right hand vertical posts 54, 56, a top cross member 58 supporting the forming and filling head 22. The frame also includes a lower cross member 59, a pair of horizontal legs 60, 62 terminating in four identical foot or pedestal units each designated 64. In the preferred form, a pair of support brackets 66 (one only shown in FIG. 1) extend upwardly from the rear of the frame legs 60, 62 and are positioned by a transverse frame unit 68 and a roller axle 70. The web 24 extends upwardly from a roll of film 71 supported on the axle 70 at the rear of the machine.

Figure 3:
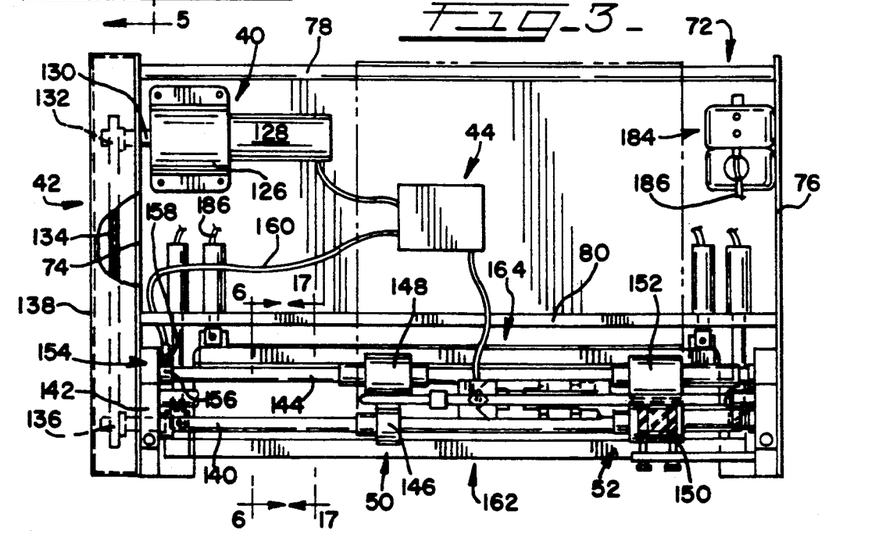
FIG. 3 is a top plan view of the apparatus of FIG. 1, showing other aspects of the forming and filling station, and also showing the dispenser and certain details of the rollers for forming the labyrinth seal on the bag margin.

Referring now to other constructional details of the forming and filling head 22, the head 22 includes a frame generally designated 72 and shown to include side members 74, 76, a rear cross brace 78 and a center cross brace 80 (FIG. 3). In addition, the head 22 serves to position web top guide means in the form of an upper cross bar 82 extending between brackets 84, 86 secured at or near the top of vertical struts 88, 90. The right hand strut 90 also includes a bracket 92 for positioning an intermediate cross bar 94 which in turn carries a bracket 96 for supporting a sheet edge positioner generally designated 98. An end portion 100 which is generally C-shaped in front elevation serves as the edge guide for the positioner 98; this positioner engages the folded over web to position its left margin.

Figures 2, 4, 5:
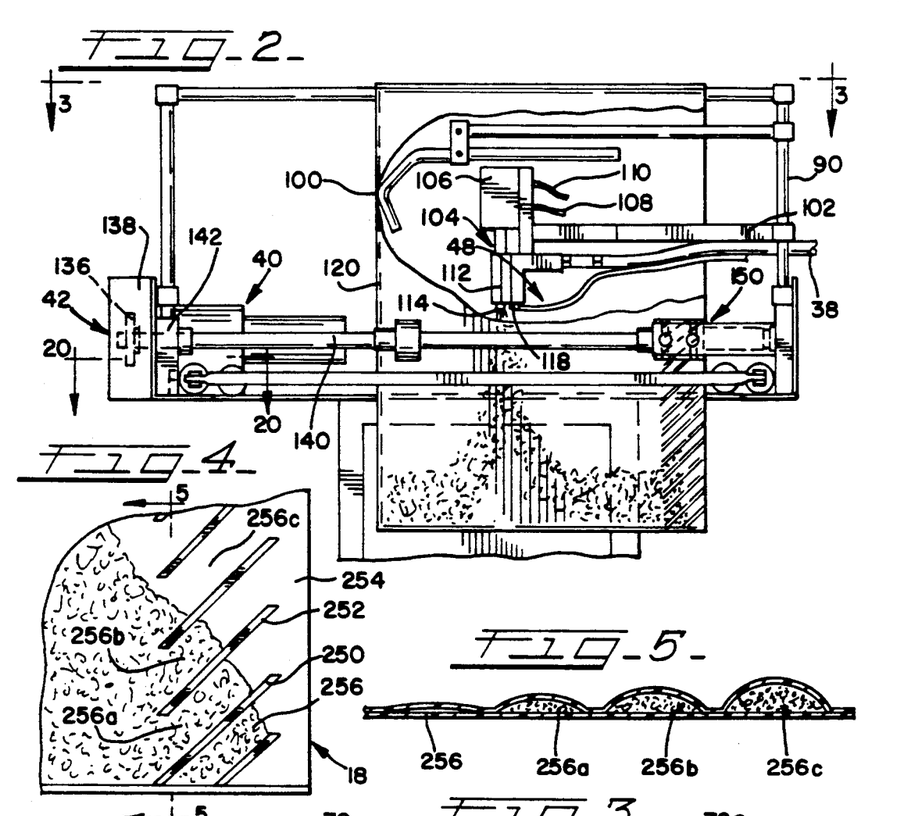
FIG. 2 is an enlarged fragmentary front elevational view, with portions broken away, showing certain elements of the envelope and bag forming and filling apparatus of FIG. 1 in greater detail.
FIG. 4 is a greatly enlarged fragmentary front elevational view of a portion of a bag incorporating one form of labyrinth seal of the invention.
FIG. 5 is a vertical sectional view, taken along line 5—5 of FIG. 4 on a further enlarged scale, and showing the foam expanding within the labyrinth seal forming a part of the bag of FIG. 4.

Referring in particular to FIG. 2, it will be noted that the strut 90 also includes an adjustable dispenser support bracket 102 to which a dispenser head generally designated 104 is securely fixed. At the end of the bracket 104 is a dispenser control unit 106 controlled by lines 108, 110 making desired connections to the control unit 44. The lower portion of the dispenser 26 includes a mixing chamber 112, an outlet nozzle 114 and inlets for the pair of substantially identical ends 116 on hoses 38. The end portion 118 of a nozzle rinsing assembly is also shown.

From the foregoing, and referring in particular again to FIG. 2, it will be noted that the web of sheet material is positioned in face-to-face, doubled over relation so as to form a folded-over edge generally designated 120 on its left side and to provide overlying, aligned margins 122, 124 (FIGS. 8–12) which are spaced apart in the front to rear sense so as to permit entry of the dispenser head.

Referring now to FIG. 2 and 3, the operation of the motor and drive train systems 40, 42 for advancing the web will be described. Principal elements of the drive mechanism include a holddown brackets 126 for the motor 40, a motor control unit 128, a drive shaft 130, a drive sprocket 132 for actuating a toothed belt 134 which is trained over and drives a driven sprocket unit 136. A shroud 138 customarily covers the drive belt and sprocket system.

The driven sprocket 136 is keyed to and causes rotation of a main roller drive shaft 140, and a gear set of a conventional kind (not shown in detail) disposed within a drive cover housing 142. In use, the meshing gears cause the driven or countershaft 144 to rotate at the same angular velocity as the main shaft 140, whereby the driving and driven rollers 146, 148 of the left hand roller pair 50 rotate at the same peripheral speed and serve to pinch between them and advance a portion of the web. Seaming rollers 150, 152 comprising the right hand side roller pair 52 are likewise keyed to the same respective shafts 140, 144 and rotate with the same peripheral velocity. In use, therefore, assuming that a signal from the feed control unit 44 is sent to the motor control 128 and the motor 126 is energized, the combination of drive shaft, various sprockets and belts will cause both roller pairs 50, 52 to advance the web in increments of length determined by the signal fed to the motor drive control 128. Likewise, the feed control unit 44 also instructs the dispenser 26 when a charge of material is to be deposited, as by sending appropriate signals through the leads 108, 110. As will appear, the foaming ingredients are customarily deposited during a part, but not all of, the time the web is being advanced.

Referring now to a desirable, but not necessary, safety feature of the invention, a deposit override control assembly generally designated 154 is provided, and this unit is shown to include a rotor 156 or the like with a plurality of magnetic bars spaced about the circumference thereof, a Hall effect or like pickup device 158, and a conductive lead 160, having one end attached to the pickup 158 and the other to the feed control unit 44. As implied by the name, this safety device provides feed to an "and" gate within the feed control unit 44 whereby when a deposit of foamable materials is called for by the operator, the Hall effect pickup device 158 must detect rotary motion in the driven roller and pass an enabling signal to the control 44 as a condition to energizing the dispenser unit 26. In other words, the foam will not be deposited unless the web is advancing, at least insofar as this can be indicated by rotation of the countershaft 144.

Another principal feature of the apparatus is the means 32 for forming the end seam on the web and providing areas of weakness for separation of adjacent bags.

Figures 17, 18, 19, 20, 21, 22:
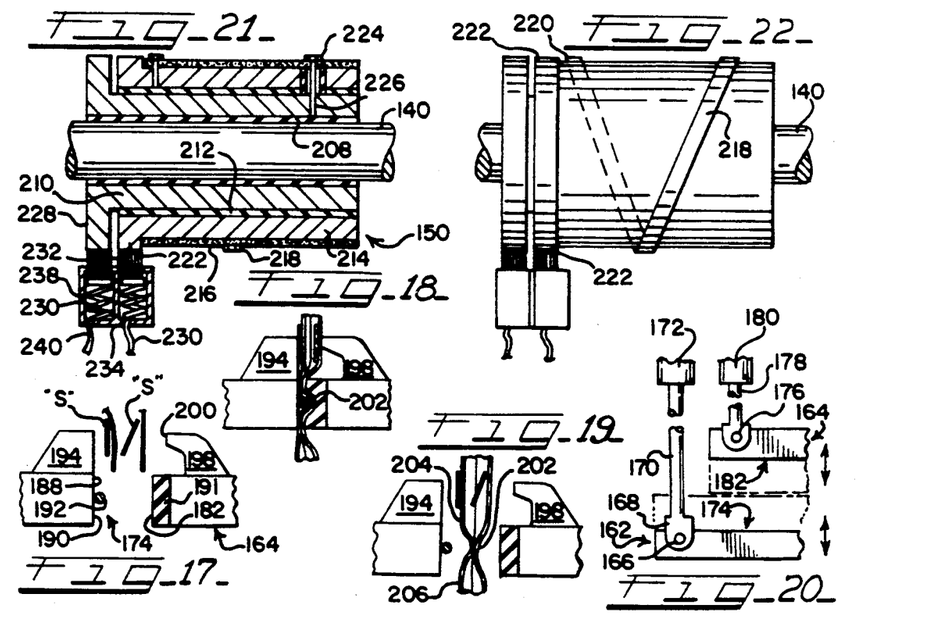
FIG. 17 is an enlarged vertical sectional view, taken along lines 17—17 of FIG. 3 and showing certain details of one form of seal bar used to form the transverse end seams and the lines of weakness for separating the bags from each other.
FIGS. 18-19 are views similar to FIG. 17, showing the operation of the seal bars of FIG. 17.
FIG. 20 is an enlarged fragmentary view of the seal bars of FIGS. 17-19, taken along lines 20—20 of FIG. 2.
FIG. 21 is a vertical sectional view, on a greatly enlarged scale, showing details of one form of seaming roller of the invention used to form a labyrinth seal.
FIG. 22 is an elevational view of the roller of FIG. 21.

Referring to FIGS. 2, 3, and 17–20, the seam-forming means is shown to comprise a pair of horizontally spaced apart, front and rear heat sealing bars generally designated 162, 164. As shown in FIG. 20, the leading or front bar 162 includes a pin 166 disposes at its end portion and extending through a clevis 168 on the end of an operating rod 170; the other end of the rod 170 cooperates with a piston (not shown) lying within a piston and cylinder assembly 172 to cause reciprocation of the bar 162 in the directions of the arrows. The inwardly directed faces generally designated 174 of the bar 162 includes a heat seal unit which will be described in detail. As in further shown in FIG. 20, the inner bar 164 also includes a pin and clevis arrangement 176, an operating rod 178 and a piston and cylinder assembly 180. The edge portion 182 includes heat sealing elements as will be described.

A heat seal controller assembly generally designated 184 includes controls of a conventional kind and is adapted to send pneumatic power through lines 186 to the piston and cylinder assemblies. In an alternate form, these may be actuated electrically, as by solenoids or hydraulically, if indicated.

Referring now to FIGS. 17–19, it will be noted that in the preferred form, one bar, such as the seal bar 162 includes on its face portion 174 upper and lower heated surfaces 188, 190 separated by a wire 192; a rubber buffer unit 194 is disposed above the bar 162 with its face parallel to the inner face of the seal bar 162. Opposed facing sheets "S" of the material for forming the heat seal are schematically shown as extending downwardly between the bars. The right hand side (FIG. 17) or inner heat seal bar 164 is shown to include a surface pad 196 forming the part of its surface which opposes the surfaces 188, 190 and the wire 192; this pad cooperates with its counterparts on the other bar to retain and form the heat seal. A positioner element 198 is disposed atop the bar 164 and cooperates with the rubber buffer 194 such that the nose portion 200 on the positioner element 198 serves to preposition or hold the sheets "S" together.

FIG. 18 shows the sheets entrapped between the bars 162, 164 and shows that the heated wire sealing element 192, which projects beyond the faces of the other heat seal surfaces 188, 190 is creating a reduced thickness section of the film and hence a line of weakness 202 (FIG. 19) in the film between the opposed heat seal bands or margins 204, 206. FIG. 19 shows the areas 202, 204, 206 just referred to after the bars have been separated from each other.

Referring now to another important feature of the invention, the right hand side or seaming roller pairs 52, and in particular the construction of the outer or heated labyrinth seaming roller 150 is shown in detail in FIGS. 21 and 22. Here, it is shown that the drive shaft 140 extends through and is press fit into a layer 208 of insulation ensuring that the roller 150 will rotate with the shaft. The roller assembly 150 includes an inner, electrically conductive cylindrical core unit 210 spaced by a cylinder 212 of electrical insulation from an outer cylinder 214 which is also electrically conductive.

The outermost surface of the seaming roller 150 is formed from an electrically insulating, smooth, nonadherent layer 216 of a material such as a silicone rubber and includes an electrically conductive resistance tape 218 laid thereover. One end 220 of the tape (FIG. 22) 218 is in contact with the electrically conductive flange 222 of the outer cylinder 214. The other end 224 of the tape 218 is in electrical contact with a pin 226 which extends into electrical contact with the inner conductive cylinder 210. A radial flange 228 of the inner cylinder 210 is also electrically conductive, and consequently, electrical current may be fed in the use of the device from a lead 230, through brushes 232 positioned by springs 234 urging the brushes against the flange 222 of the outer cylinder 214. The current then passes through the entire length of the tape and thence through the pin 226 into the inner cylinder 210 where electrical contact is made through brushes 236, providing a return current path through the other spring set 238 and return conductor 240.

Figure 23:
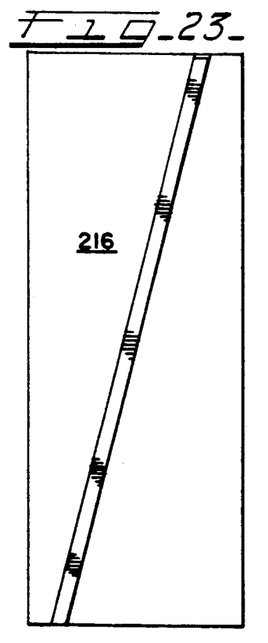
FIGS. 23, 24, 25 and are developed or projected views of different profiles of seaming rollers useful to form the labyrinth side seal on bags made according to the invention.
Figure 24:
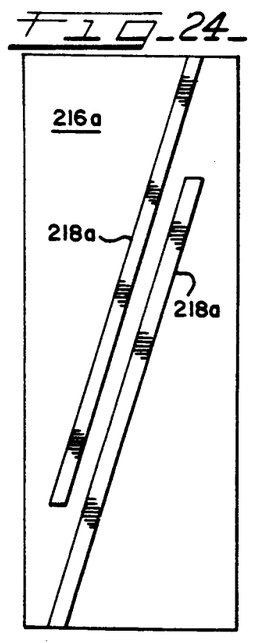
Figure 25:
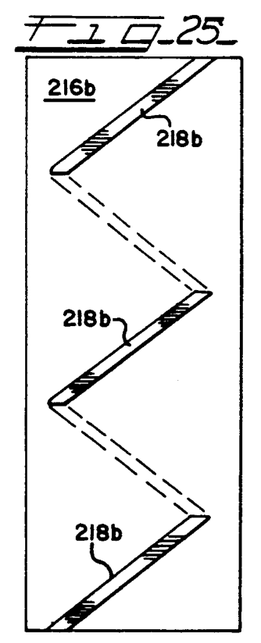

According to the invention, and referring now to FIGS. 23–25, it is shown that the outer surface 216 of the roller 150 in a projected view appears to have the electrically conductive tape 218 running diagonally thereacross. As shown in FIGS. 24 and 25, for example, the surfaces 216a, 216b may have different forms of conductive tape 218a, 218b on their surfaces to provide a different labyrinth pattern.

For example, the form of tape shown in FIG. 23 will form a series of diagonal heat seal bands on the margin of the being-formed bag. The margins will have one edge beginning where the other ends, and have a diagonally extending offset pattern.

The form of seal shown in FIG. 24 provides an overlap somewhat as illustrated in FIG. 4; here, diagonally extending heat sealed areas 250, 252 are formed in the margin 254 of the bag 18. Other patterns such as the patten shown in FIG. 25 may be desirable for use, depending on the intended application. In this connection, reference is made again to FIGS. 4 and 5 where the operation of the seal is shown.

Here, a plurality of passages 256, 256a, 256b, 256c, for example are shown. As the foam begins to move into the passages 256, 256a, for example, a relatively long path of relatively narrow cross section is provided. As the foam expands and passes through this path under the influence of gravity and its own expansive tendencies, its viscosity and adhesion are gradually increasing, and it requires energy to fill the entire passage. As its viscosity increases and its adhesion to the film continues to increase, resistance to flow increases and alternate, upstream paths such as the paths 256b, 256c begin to fill. This continues with the foam extending into, but not passing through the passages, whose side seam angle and hence whose length and cross section is determined after suitable experimentation. The open passages permit hot air and residual propellant gas or vapor to pass from the interior of the bag to the exterior, but because of the labyrinth effect, prevent the solidifying foam from leaking from the side of the bag.

Figure 8:
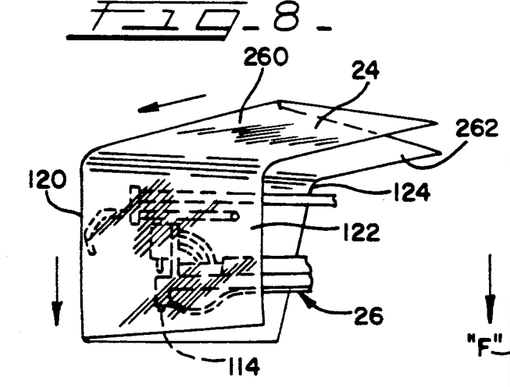
FIG. 8 is a diagrammatic view illustrating certain steps of the method of the invention and showing a folded-over web of flexible material in relation to the dispenser unit of the invention before the envelope is formed.

Referring now to FIGS. 8–12, the method of the invention is shown in a relatively simple, schematic form. Referring to FIG. 8, the web 24 of material is shown being advanced along a horizontal axis and then moving along a vertical movement path. In the form shown, the web 24 is folded over upon itself so as to form opposed sheets 260, 262 folded about a common closed edge 120. Opposed margins 122, 124 then overlie each other as the web is advanced downwardly. These margins 122, 124 are spaced apart from each other to permit the dispenser unit 26 to extend therebetween. The dispenser 26 therefore has its nozzle portion 114 enclosed between the two facing sheets. This illustrates the manner of feeding the web of flexible material before the first part of envelope formation takes place.

Figure 9:
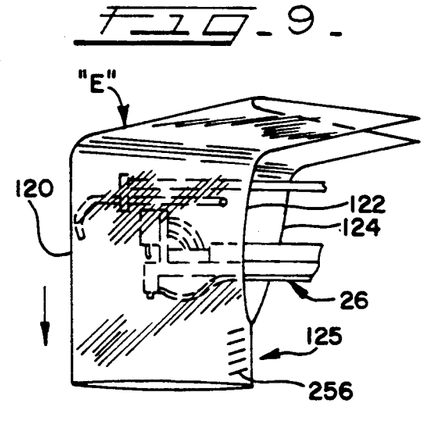
FIG. 9 is a diagrammatic view similar to that of FIG. 8, but showing the envelope partially formed by the creation of a side seam where the opposed free margins of the web are bonded together by a labyrinth side seam.

FIG. 9 shows the next step in forming a partial envelope generally designated "E". This is carried out by creating a side seam generally designated 125 and comprising a plurality of the labyrinth style heat seals such as the heat seal strips 256 shown in FIG. 4. FIG. 9 thus shows what may be described as a partial envelope having the one closed side seam 120, and a partially open upstream side seam formed by the portions 125, 122, 124 respectively.

Figure 10:
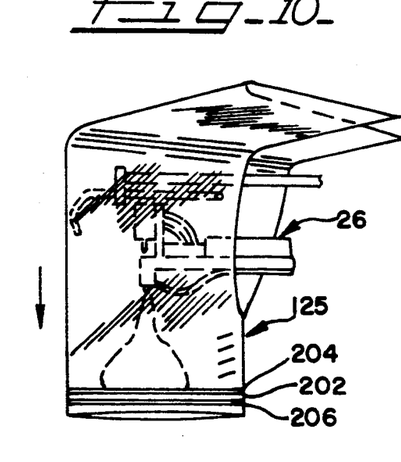
FIG. 10 is view similar to that of FIGS. 8 and 9 and showing in a diagrammatic way the formation of the transverse top and bottom seams which begin to define a foam-receiving pocket in the web material and further showing a charge of foamable material beginning to be deposited into the downstream portion of the envelope which now includes leading edge seams and side seams.
Figure 11:
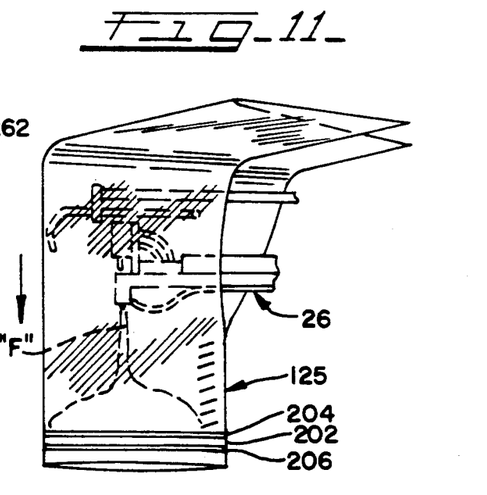
FIG. 11 is a view similar to that of FIG. 10, showing foam deposition being discontinued and completion of the side seam past its point of intersection with the end seam to be formed.

FIG. 10 shows the next step in the process, that is, the step of forming transverse, closely spaced apart seams 204, 206, separated by a line of weakness 202 therebetween. Referring to FIG. 10, it will be understood that, when the process of the invention is initially begun, only one end seam is required. Thereafter, the end seams are formed in pairs because the seam-forming operation comprises completing the formation of a leading bag and performing an intermediate step in the formation of the envelope which will become the following bag. As soon as the transverse seam 204 has been formed by reciprocation of the heat seaming bars 162, 164 and maintaining them together for a suitable dwell time, the bottom seam of the envelope is formed and deposition of the foamable ingredients, such as the charge of materials "F" (FIG. 11) begins.

Figure 12:
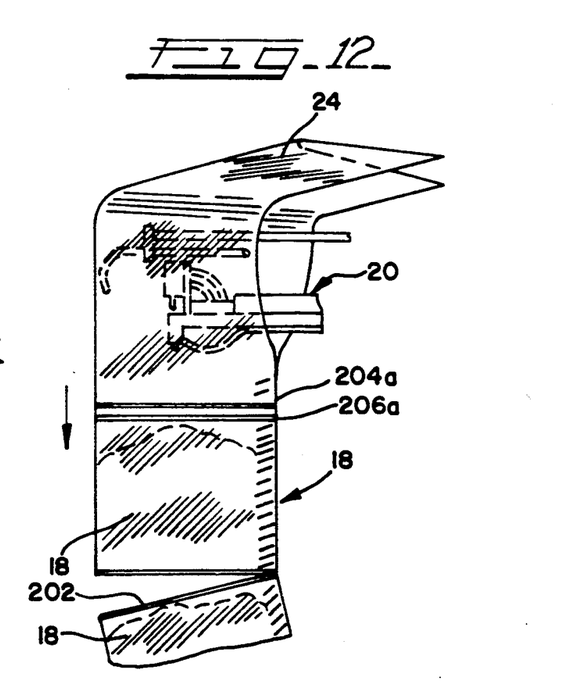
FIG. 12 is a view similar to FIGS. 8-10, showing a finished and filled bag being separated from a following bag, an intermediate bag which is filled and seamed, and wherein the foam is continuing to expand further upstream, and an envelope beginning to be formed from a following or uppermost increment of web material from which a bag is about to be formed by seaming portions of the opposed webs together to form end seams.
Figure 13:
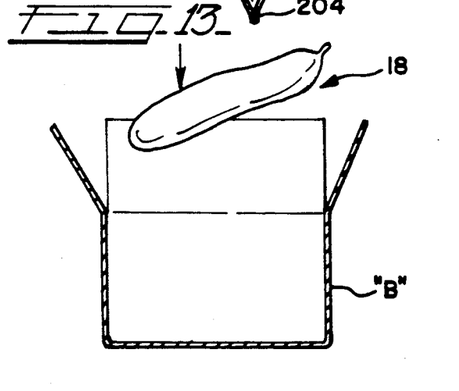
FIG. 13 is a diagrammatic view of the manner of packaging a fragile product using a shipping box or like container and foam-filled bags made according to the invention.

Referring again to FIG. 11, it will be noted that the length of side seam 125 is increasing, inasmuch as the side seaming operation continues while the web is being advanced through another increment of length. The previously formed seamed area comprising the seams 204, 206 and the line of weakness 202 advances downwardly. After a few seconds, a full charge of foamable ingredients has been deposited and further deposition ceases. The web is normally advanced for a brief time thereafter and additional side seam 125 continues to be formed. Thereupon, the advancing mechanism is transiently disengaged and a second set of seams 204a, 206a is formed in the web. This finishes the creation of a filled bag 18, and the bag may be separated along the line of weakness 202, as its predecessor has been in the manner illustrated in FIG. 12. FIG. 12 also shows that a new side seam is beginning to be formed and that during this entire operation, additional 'increments of the web 24 have been advanced from the supply (not shown) so that the continuous process of envelope formation and filling, and bag completion and separation may be carried out.

In the form of invention described, and as presently preferred, the folded-over single web of material provides advantages in use for the reason that only a single side seam is required to be formed. As shown in FIG. 1, the side seam guide unit 100 may be positioned so as to lie farther to the left or right if it is desired to make a bag of different width. The roller pair 50 which serves to advance the folded-over of the sheet material may be moved to an appropriate position; this is the only change required to make a narrower or wider bag.

Referring now to the matter of bag length, it is possible to create bags of any length by simply programming the controller 42. A suitable means of doing this may be programming a microprocessor (not shown) of a type known to those skilled in the art, for actuating the drive motor for a different time interval. The programmer may be set to advance the bag continuously until commanded to stop, or may have available a number of preset advance durations, or both. Preferably, the duration may be adjusted and programmed such that a choice of three or four typical increments of length, and continuous advancement, will be available. Similarly, the same type of control may be programmed for use in selecting from preset durations of ingredient dispensing, or the program may permit manual, control over the duration of product deposition. Preferably, a manual mode of control is available for each operation so that, for example, a bag length of 24 inches might correlate with a dispensing time of 2 seconds; a bag length of 36 inches with 3 seconds, etc. The manual mode may be selected to cooperate with a predetermined or continuous length of web advancement.

Another feature of the invention is the provision of a nozzle rinsing apparatus shown as 118. Here, a small pneumatic accummulator may be used in conjunction with a supply (not shown) of solvent. After completion of each dispensing cycle, a short burst of solvent is directed by an air stream across the face of the nozzle 114. The material dislodged is blown towards the closed side of the being-formed bag and remains inside the bag interior.

In the preferred form of apparatus, the isocyanate and resin components received in the tanks 34, 36 respectively may be fed through the hoses 38 by a separately supplied, nitrogen overpressure system of a kind known to those skilled in the art. This system obviates the need for pumps or the like and has proved successful in other urethane-dispensing operations. Other auxilliary functions may be provided in the machine, such as initiation of the operation by push buttons on the console 28 or the like. As shown, the various guide arrangements are in the form of adjustable clamps which may be made in a suitable manner depending on the size of the web or other application variables.

Figure 14:
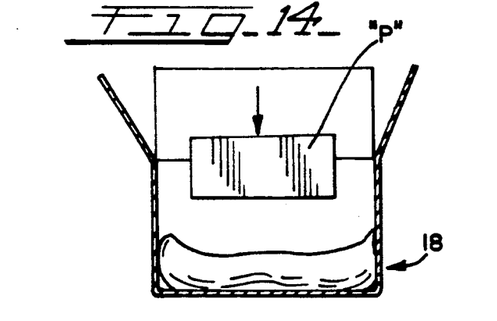
FIGS. 14-16 are diagrammatic views similar to those of FIG. 13 and showing respectively the placing of an object atop a still-expanding, foam-filled bag, covering the object with a second, similar bag and closing the box to confine the article and complete the customary bag expansion while the bags and the object are confined within the box.
Figure 15:
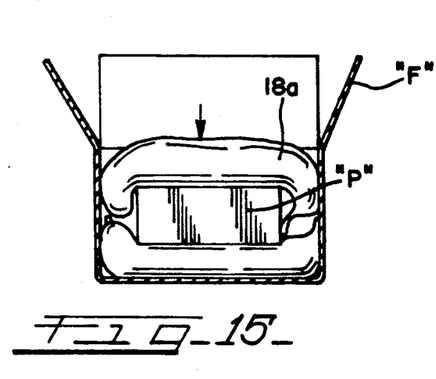
Figure 16:
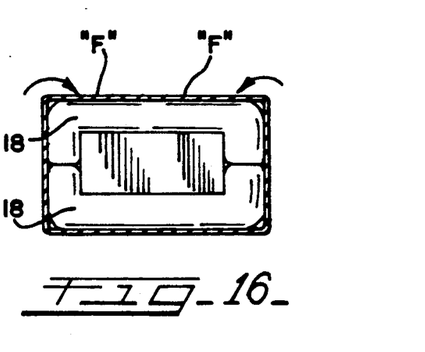

In the preferred manner of use, the operator obtains a plurality of boxes such as those shown in FIGS. 13-16, and as the bag 18 are filled, and detached from the following bag in the formation and filling sequence, the bags are placed in the boxes "B" (FIG. 18). Then a package "P" is inserted as shown in FIG. 14. During this time, the foam within the bag has expanded significantly but is still capable of and is in fact undergoing, further expansion. The package "P" then rests upon the upper surface of the further expanding bag 18 and as expansion continues, another bag 18a (FIG. 15) is placed over the package "P" and the flaps "F" of the box "B" are moved to a closed and sealed position as shown in FIG. 16. The flaps are then held in this position as by securing with tape or otherwise until foam formation is complete. This ensures that the package "P" will be closely surrounded and supported in cushioning relation to the box "B".

Figure 6:
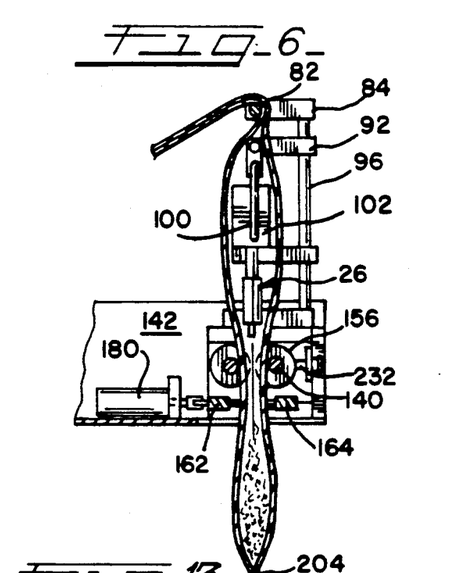
FIG. 6 is a vertical sectional view, taken along lines 6—6 of FIG. 3, and showing the manner of filling the lower portion of the elongated envelope from which a filled bag will be formed.
Figure 7:
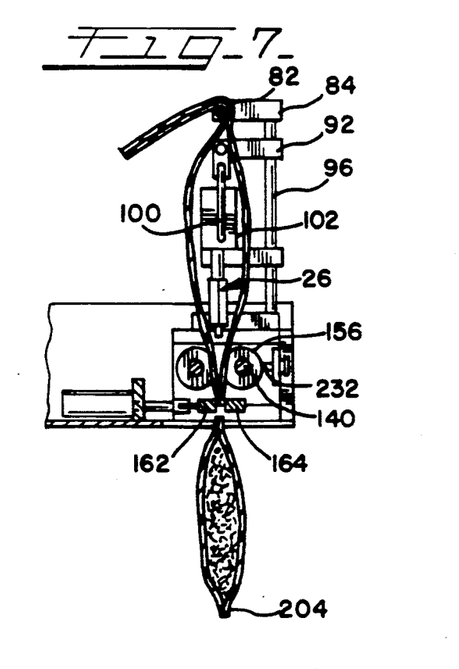
FIG. 7 is a view similar to that of FIG. 6, showing a leading bag already formed, filled, and being separated from the envelope and the formation of a new partial envelope with a closed leading edge seam and a partially completed side seam.

FIGS. 6 and 7 may be taken in connection with the description of FIGS. 8-12 and illustrated the dispenser 26 in dispensing a charge of foam into the bag being formed from the web of sheet material. The positions of the sealing bars 162, 164 are shown with portions of their actuator mechanisms. A vertical dispensing arrangement is shown and is a preferred form of practicing the invention. It is possible that the dispensing may occur in a horizontal plane if the foam can be propelled a suitable distance. However, the use of gravity to secure foam deposition past the planes respectively of the side seaming roller and the sealing bars into the area therebeneath is the preferred form of insuring that the foam is confined during foaming and yet there is continuity of the web until the complete bag has been formed prior to intentional separation.

It will thus be seen that the present invention provides a low cost, reliable method and apparatus for forming and filling bags of flexible cushioning packaging material and that such methods and apparatus have a number of advantages and characteristics, including those herein pointed out and others which are inherent in the invention. It is anticipated that variations and modifications to the described form of apparatus and methods will occur to those skilled in the art and that such modifications and changes may be made without departing from the spirit of the invention or the scope of the appended claims.

We claim:

1. A foam cushion for packaging purposes comprising: a cushion envelope including a foam-receiving cavity defined by a unitary web, said web being folded over itself to provide a folded side and having a pair of spaced apart opposed end seams extending generally perpendicularly from the folded side and an intermittent labyrinth side seam extending between said end seams and opposite the folded side and cushioning foam in said foam-receiving cavity.

2. A foam cushion as in claim 1, wherein said cushioning foam comprises polyurethane.

3. A foam cushion for packaging purposes comprising: a cushion envelope including a foam-receiving cavity defined by a unitary web, said web being folded over itself to provide a pair of opposing web faces, a folded side and an opposed open side, said web having a pair of spaced apart opposed end seams extending generally perpendicularly from the folded side and a labyrinth formed by a plurality of side seams lying along the open side of said web, each said side seam including a seal passage defined by a plurality of spaced apart heat seal bands joining portions of the opposing web faces adjacent the open side, each of said seal passages having a length and a cross sectional configuration defined such that gases are permitted to pass outwardly from the cushion envelope but an expanding and solidifying cushion foam material dispensed in said cushion envelope is prevented from passing fully through said passages and thereby leaking out of the open side of the web, said labyrinth extending between said end seams and opposite and folded side, and cushioning foam in said foam-receiving cavity.

4. A foam cushion as in claim 3, wherein said web comprises plastic film.

5. A foam cushion as in claim 4, wherein said plastic film comprises polyethylene.

* * * * *